(12) United States Patent
Nonaka et al.

(10) Patent No.: US 7,313,970 B2
(45) Date of Patent: Jan. 1, 2008

(54) DIAPHRAGM-TYPE PRESSURE SENSING APPARATUS

(75) Inventors: Toshihito Nonaka, Chiryu (JP); Shingo Wanami, Kariya (JP); Minoru Fujioka, Anjo (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/407,399

(22) Filed: Apr. 19, 2006

(65) Prior Publication Data

US 2006/0236776 A1    Oct. 26, 2006

(30) Foreign Application Priority Data

Apr. 21, 2005  (JP) .............................. 2005-123915

(51) Int. Cl.
*G01L 7/00* (2006.01)
(52) U.S. Cl. .......................................... 73/756; 73/753
(58) Field of Classification Search .......... 73/700–756; 361/283.1–283.4
See application file for complete search history.

(56) References Cited

U.S. PATENT DOCUMENTS

| 5,303,593 | A | * | 4/1994 | Kremidas | 73/708 |
|---|---|---|---|---|---|
| 5,319,980 | A | * | 6/1994 | Kremidas | 73/721 |
| 5,343,757 | A | * | 9/1994 | Tate | 73/724 |
| 5,670,722 | A | * | 9/1997 | Moser et al. | 73/756 |
| 5,802,912 | A | * | 9/1998 | Pitzer et al. | 73/756 |
| 5,814,765 | A |   | 9/1998 | Bauer et al. | |
| 5,880,372 | A | * | 3/1999 | Nasiri | 73/726 |
| 5,932,808 | A | * | 8/1999 | Hayashi et al. | 73/724 |
| 6,209,398 | B1 | * | 4/2001 | Fowler et al. | 73/724 |
| 6,647,793 | B2 |   | 11/2003 | Dirmeyer et al. | |

FOREIGN PATENT DOCUMENTS

DE    103 33 964 A1    2/2005
JP    02-249740    10/1990

OTHER PUBLICATIONS

Office Action issued from German Patent Office dated Jul. 18, 2007 in the corresponding German Patent Application No. 10 2006 018 365.7.

* cited by examiner

*Primary Examiner*—Edward Lefkowitz
*Assistant Examiner*—Jermaine Jenkins
(74) *Attorney, Agent, or Firm*—Harness, Dickey & Pierce, PLC

(57) ABSTRACT

A diaphragm-type pressure sensing apparatus includes a pressure sensor having a diaphragm for converting pressure into an electrical signal, a circuit board for processing the electrical signal, and a housing in which the pressure sensor and the circuit board are sealed. The pressure sensor is bonded to the housing and sandwiched between the circuit board fixed to the housing and the housing. This structure reduces compressive stress applied to the pressure sensor and the circuit board so that accuracy of the pressure sensing apparatus can be improved.

8 Claims, 1 Drawing Sheet

DIAPHRAGM-TYPE PRESSURE SENSING APPARATUS

CROSS REFERENCE TO RELATED APPLICATION

This application is based on and incorporates herein by reference Japanese Patent Application No. 2005-123915 filed on Apr. 21, 2005.

FIELD OF THE INVENTION

The present invention relates to a diaphragm-type pressure sensing apparatus for sensing pressure with a diaphragm.

BACKGROUND OF THE INVENTION

A vehicular safety system with a diaphragm-type pressure sensing apparatus is disclosed in JP-A-H2-249740. In the safety system, the pressure sensing apparatus is built into a side door of a vehicle and detects a shock wave of a collision. Thus, the safety system inflates an airbag when the collision occurs.

As shown in FIG. 2, this type of pressure sensing apparatus includes a pressure sensor 1, a circuit board 2, a housing 3, and a cover 4.

The pressure sensor 1 is constructed such that a semiconductor chip having a diaphragm is packaged in a resin-molded package with an opening through which the diaphragm is exposed.

The circuit board 2 has a mounting surface where the pressure sensor 1 and the circuit board 2 can be electrically connected. The circuit board 2 is fixed to the housing 3 and the pressure sensor 1 is mounted to the mounting surface of the circuit board 2. The circuit board 2 includes a signal processing circuit 21 for processing a detection signal output from the pressure sensor 1 and a constant voltage circuit for supplying a power voltage to a pressure transducer (e.g., a strain gauge sensor) mounted to the diaphragm of the pressure sensor 1. The housing 3 includes a pressure inlet port 6, a connector 8 having connector terminals 9, and a bottom wall 30. The connecter terminals 9 are soldered to the circuit board 2 inside the housing 3.

Pressure to be measured is introduced into a pressure sensing surface of one side of the diaphragm of the pressure sensor 1 through the pressure inlet port 6 of the housing 3. A vacuum chamber maintained at a reference pressure is located on the other side of the diaphragm and the diaphragm acts with reference to the reference pressure. When the measured pressure is introduced into the sensing surface of the diaphragm, the diaphragm is deflected toward or away from the vacuum chamber. The deflection of the diaphragm is converted into an electrical signal.

A perimeter portion of the sensing surface is pressed down on the bottom wall 30 of the housing 3 through a rubber-packing member 7 for sealing between the pressure sensor 1 and the bottom wall 30. Although this approach allows the measured pressure to be introduced into only the sensing surface of the pressure sensor 1 and prevents moisture ingress into the housing 3 through the pressure inlet port 6, undesired bending stress is applied to the pressure sensor 1 and the circuit board 2.

In order to reduce the bending stress, the pressure sensing apparatus is reinforced such that a resin-potting member 10 is provided on one side of the circuit board 2. However, in spite of the reinforcement, compressive stress in a thickness direction (i.e., top-bottom direction in FIG. 2) of the pressure sensing apparatus may be applied to the perimeter portion of the sensing surface of the pressure sensor 1 and a portion of the circuit board 2, the portion of which is positioned close to the perimeter portion of the sensing surface. The compressive stress affects circuit components such as the diaphragm of the pressure sensor 1, thus reducing accuracy of the pressure sensing apparatus. The rubber-packing member 7 increases the size, weight, and material cost of the pressure sensing apparatus.

In assembly of the pressure sensing apparatus, accurate alignment between the sensing surface of the diaphragm of the pressure sensor 1 and the pressure inlet port 6 is required. Further, the circuit board 2 is required to be fixed to the housing 3 while the pressure sensor 1 mounted to the circuit board 2 is prevented from tilting. The requirements make the assembly of the pressure sensing apparatus complicated.

SUMMARY OF THE INVENTION

In view of the above-described problem, it is an object of the present invention to provide a diaphragm-type pressure sensing apparatus that is easily assembled and has a high accuracy, a small size, and a light weight.

A diaphragm-type pressure sensing apparatus includes a pressure sensor having a diaphragm that has a pressure sensing surface and converts pressure introduced into the pressure sensing surface into an electrical signal, a circuit board for processing the electrical signals, and a housing having a pressure inlet port for introducing the pressure into the pressure sensing surface of the diaphragm of the pressure sensor.

The circuit board and the pressure sensor are sealed inside the housing except the pressure sensing surface. The pressure sensor has a first surface fixed to the circuit board and a second surface provided with the pressure sensing surface. In the second surface of the pressure sensor, a perimeter portion of the pressure sensing surface is bonded to an inner surface of the housing through an adhesive member. Thus, the perimeter portion of the pressure sensing surface is substantially fixed to the inner surface of the housing.

This structure of the pressure sensing apparatus can reduce compressive stress applied to the pressure sensor and the circuit board so that accuracy of the pressure sensing apparatus can be improved. A rubber-packing member for sealing between the pressure sensor and the housing is not required so that the number of parts of the pressure sensing apparatus can be reduced. Accordingly, the size and weight of the pressure sensing apparatus can be reduced. Because the pressure sensor is bonded to the housing, the pressure sensing apparatus can be easily assembled.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
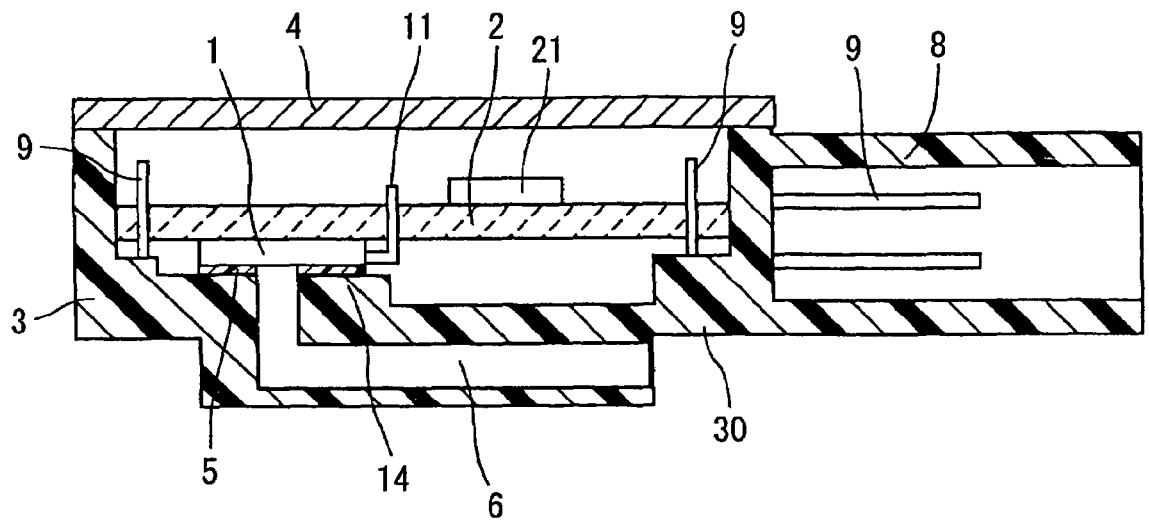
FIG. 1 is a cross-sectional view showing a diaphragm-type pressure sensing apparatus according to an embodiment of the present invention.

A diaphragm-type pressure sensing apparatus according to an embodiment of the present invention will now be described with reference to FIG. 1. The pressure sensing apparatus includes a thin plate-like pressure sensor 1, a circuit board 2, a housing 3, a cover 4, and an adhesive member 5.

The pressure sensor 1 has a diaphragm (not shown) for converting pressure into an electrical signal and a sensor terminal 11 connected to the circuit board 2. The circuit board 2 has a signal processing circuit 21 for processing a voltage signal output from the pressure sensor 1. The housing 3 is made of resin and has a bowl-like shape with a top opening. The housing 3 includes a pressure inlet port 6, a connector 8, and a bottom wall 30. As shown in FIG. 1, the pressure inlet port 6 is provided with the bottom wall 30. Aside wall of the housing 3 extends outwardly (i.e., to the right direction in FIG. 1), thus providing the connector 8. The connector 8 has connector terminals 9. Each of the connector terminals 9 has one end portion positioned inside the connector 8 and the other end portion that extends from the inner surface of the bottom wall 30 toward the top opening (i.e., upwardly in FIG. 1), passes through a through hole provided in the circuit board 2, and is soldered to the circuit board 2. Thus, the circuit board 2 is fixed to the housing 3. The cover 4 is attached to the top opening of the housing 3 so that the pressure sensor 1 and the circuit board 2 can be sealed inside a sensor housing constructed with the housing 3 and the cover 4.

The pressure sensor 1 may be, for example, constructed such that a semiconductor chip having the diaphragm and a strain gauge sensor (not shown) mounted to the diaphragm is packaged in a resin-molded package with a sensing opening through which a pressure sensing surface of one side of the diaphragm is exposed.

Figure 2:
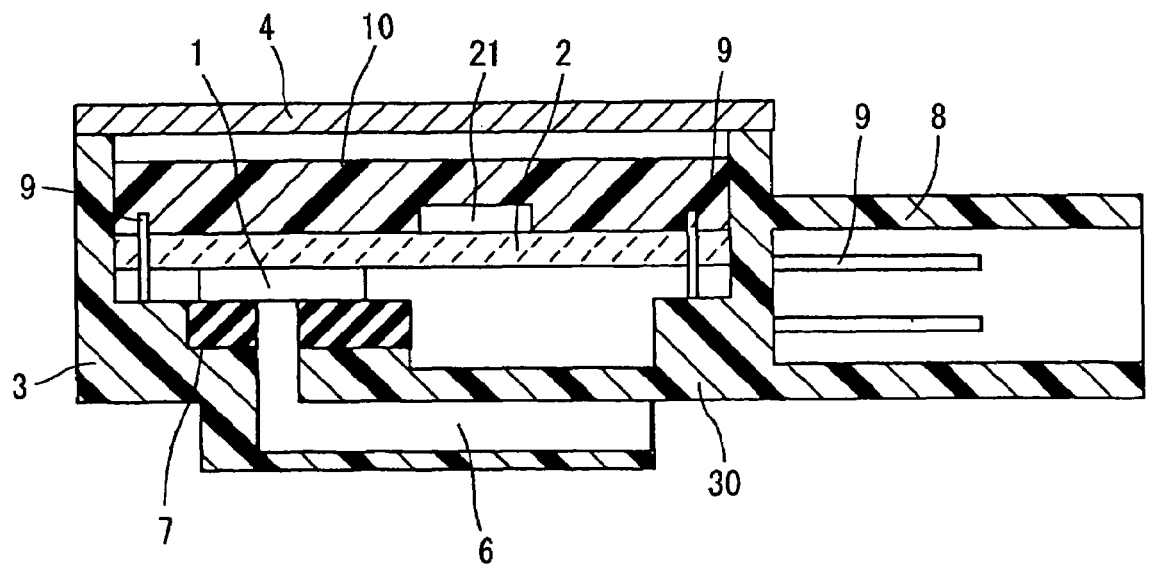
FIG. 2 is a cross-sectional view showing a diaphragm-type pressure sensing apparatus according to a related art.

The pressure sensor 1 has a main surface 14 provided with the sensing opening. The pressure sensor 1 is bonded to the inner surface of the bottom wall 30 through the adhesive member 5 in such a manner that the sensing surface of the diaphragm of the pressure sensor 1 faces the pressure inlet port 6. Therefore, a perimeter portion of the sensing opening of the main surface 14 is bonded to the inner surface of the bottom wall 30 of the housing 3. Thus, the sensing surface of the pressure sensor 1 is exposed to an outside of the housing 3 through the pressure inlet port 6. In the embodiment, the rubber-packing member in FIG. 2 is eliminated.

As shown in FIG. 1, the pressure sensor 1 is sandwiched between the circuit board 2 fixed to the housing 3 and the bottom wall 30 of the housing 3 so that the pressure sensor 1 can be securely fixed to housing 3 through the adhesive member 5.

Pressure to be measured is introduced into the sensing surface of the diaphragm of the pressure sensor 1 through the pressure inlet port 6 of the housing 3. The other side of the diaphragm is open to a vacuum chamber maintained at a predetermined reference pressure. Pressure difference between the measured pressure and the reference pressure deflects the diaphragm. The deflection of the diaphragm is converted into a voltage signal by the strain gauge sensor mounted to the diaphragm. The signal processing circuit 21 of the circuit board 2 processes the voltage signal and the processed signal is output through the connector 8.

The structure of the pressure sensing apparatus of the embodiment can reduce compressive stress that is in a thickness direction (i.e., top-bottom direction in FIG. 1) of the pressure sensing apparatus and applied to the perimeter portion of the sensing opening of the main surface 14 (i.e., sensing surface of the diaphragm) of the pressure sensor 1 and a portion of the circuit board 2, the portion of which is positioned close to the perimeter portion of the sensing opening. Therefore, the compressive stress can be prevented from affecting components such as the strain gauge sensor mounted to the diaphragm of the pressure sensor 1. Further, the structure can prevent the circuit board 2 from being bent. Therefore, components mounted to the circuit board 2 can be prevented from being affected by a bending stress.

The elimination of the rubber-packing member 7 reduces the number of parts of the pressure sensing apparatus. Accordingly, the size and weight of the pressure sensing apparatus can be reduced. Therefore, the pressure sensing apparatus is suitable for a built in-pressure sensor that requires a small size.

Because the pressure sensor 1 is bonded to the housing 3, the pressure sensing apparatus can be easily assembled. Further, a desired position (i.e., no tilt) of the pressure sensor 1 and an accurate alignment between the sensing surface of the pressure sensor 1 and the pressure inlet port 6 can be easily achieved.

Although the elimination of the rubber-packing member 7 may cause thermal stress resulting from differences in thermal expansion coefficient between the pressure sensor 1, the circuit board 2, and the housing 3, material choice and shape design for the components can reduce the thermal stress. Further, the adhesive member 5 has a higher elasticity than that of the components so that the adhesive member 5 can absorb the thermal stress.

A method of assembling the pressure sensing apparatus of the embodiment is described below. The pressure sensor 1 is bonded to the inner surface of the bottom wall 30 through the adhesive member 5 in such a manner that the sensing surface of the pressure sensor 1 faces the pressure inlet port 6. Then, the connector terminals 9 and the sensor terminal 11 of the pressure sensor 1 are threaded through the through holes provided in the circuit board 2 and soldered to the circuit board 2. Thus, the circuit board 2 is fixed to the housing 3, and the pressure sensor 1 and the connector terminals 9 are electrically connected to the circuit board 2.

Alternatively, the pressure sensing apparatus of the embodiment may be assembled in a manner described below. First, the pressure sensor 1 is mounted to a mounting surface of the circuit board 2. Second, the connector terminals 9 are threaded through the through holes of the circuit board 2. Finally, the pressure sensor 1 mounted to the circuit board 2 is bonded to the inner surface of the bottom wall 30 through the adhesive member 5.

The embodiment described above may be modified in various ways. For example, the adhesive member 5 may be applied between the pressure sensor 1 and the circuit board 2.

Such changes and modifications are to be understood as being within the scope of the present invention as defined by the appended claims.

What is claimed is:

1. A diaphragm-type pressure sensing apparatus, comprising:
   a pressure sensor including a diaphragm that has a pressure sensing surface and converts pressure introduced into the pressure sensing surface into an electrical signal;

a circuit board for processing the electrical signal; and a housing having a pressure inlet port for introducing the pressure into the pressure sensing surface of the diaphragm of the pressure sensor, wherein the circuit board and the pressure sensor are sealed inside the housing except at least the pressure sensing surface of the diaphragm, the pressure sensor has a first surface fixed directly to the circuit board and a second surface opposite to the first surface provided with the pressure sensing surface, and a perimeter portion of the pressure sensing surface of the second surface is substantially fixed directly to an inner surface of the housing.

2. The pressure sensing apparatus according to claim 1, further comprising:

an adhesive through which the perimeter portion of the pressure sensing surface is fixed directly to the inner surface of the housing.

3. The pressure sensing apparatus according to claim 2, wherein the pressure sensing surface is exposed to an outside of the housing through the pressure inlet port.

4. The pressure sensing apparatus according to claim 2, wherein the circuit board is fixed to the housing such that the pressure sensor is sandwiched between the circuit board and the inner surface of the housing.

5. The pressure sensing apparatus according to claim 2, wherein the pressure sensor has a terminal electrically connected to the circuit board.

6. The pressure sensing apparatus according to claim 1, wherein the circuit board has a mounting surface where the pressure sensor can be electrically connected to the circuit board, and the first surface of the pressure sensor is fixed directly to the mounting surface of the circuit board.

7. The pressure sensing apparatus according to claim 1, wherein the pressure sensor has a thin plate-like shape.

8. The pressure sensing apparatus according to claim 1, further comprising a vacuum chamber disposed within the housing at a side of the circuit board.

* * * * *